(12) United States Patent
Illston

(10) Patent No.: US 8,452,440 B2
(45) Date of Patent: May 28, 2013

(54) METHOD OF FORMING AN ARTICLE

(75) Inventor: Trevor John Illston, Mavern (GB)

(73) Assignee: Materials Solutions, Edgbaston, Birmingham (GB)

( * ) Notice: Subject to any disclaimer, the term of this patent is extended or adjusted under 35 U.S.C. 154(b) by 451 days.

(21) Appl. No.: 12/426,304

(22) Filed: Apr. 20, 2009

(65) Prior Publication Data

US 2009/0263624 A1    Oct. 22, 2009

Related U.S. Application Data

(60) Provisional application No. 61/046,806, filed on Apr. 22, 2008.

(51) Int. Cl.
| B29B 7/14 | (2006.01) |
| B29C 33/60 | (2006.01) |
| B29C 35/04 | (2006.01) |
| B29C 35/08 | (2006.01) |
| G06F 19/00 | (2011.01) |

(52) U.S. Cl.
USPC ............. 700/119; 700/98; 700/120; 264/308; 264/401; 264/497; 345/420

(58) Field of Classification Search
USPC .................. 700/98, 118–120; 264/163, 308, 264/401, 497; 345/419, 420, 421, 423
See application file for complete search history.

(56) References Cited

U.S. PATENT DOCUMENTS

| 5,184,307 | A | * | 2/1993 | Hull et al. ..................... 700/182 |
| 5,398,193 | A | * | 3/1995 | deAngelis ..................... 700/119 |
| 5,705,117 | A | | 1/1998 | O'Connor et al. |
| 5,976,457 | A | * | 11/1999 | Amaya et al. ................... 419/36 |
| 6,214,279 | B1 | * | 4/2001 | Yang et al. ..................... 264/482 |
| 6,654,656 | B2 | * | 11/2003 | Kesavadas et al. ........... 700/119 |
| 6,656,409 | B1 | * | 12/2003 | Keicher et al. ................ 264/401 |
| 6,677,554 | B2 | * | 1/2004 | Darrah et al. ................. 700/119 |
| 6,678,571 | B1 | * | 1/2004 | Manners et al. .............. 264/401 |
| 6,909,929 | B2 | * | 6/2005 | Farnworth et al. ........... 700/120 |
| 7,496,424 | B2 | * | 2/2009 | Froeschner et al. .......... 700/119 |
| 7,930,054 | B2 | * | 4/2011 | Slaughter et al. ............ 700/119 |
| 2005/0133955 | A1 | * | 6/2005 | Christensen .................. 264/219 |
| 2006/0208396 | A1 | * | 9/2006 | Abe et al. ..................... 264/497 |
| 2012/0249538 | A1 | * | 10/2012 | Okuwaki ...................... 345/419 |
| 2012/0329008 | A1 | * | 12/2012 | Fishman et al. .............. 433/172 |
| 2013/0016098 | A1 | * | 1/2013 | Addessi ........................ 345/420 |

* cited by examiner

*Primary Examiner* — Mohammad Ali
*Assistant Examiner* — Jennifer L Norton
(74) *Attorney, Agent, or Firm* — Volentine & Whitt, PLLC

(57) ABSTRACT

A method of forming an article in a layer wise manufacturing process from a computer software file representing the article includes dividing the file into sub files in dependence of the size or other characteristics of features of the article to be created, applying a process characteristic selected independence on a characteristic feature to each sub file and manufacturing the article in accordance with the subfiles.

10 Claims, 3 Drawing Sheets

METHOD OF FORMING AN ARTICLE

BACKGROUND AND SUMMARY

This invention relates to a method of forming an article.

There are now many well known layer-wise manufacturing processes that take 3 dimensional computer aided design (3D CAD) files and create solid objects within the field known as 'rapid prototyping' and/or 'rapid manufacture'.

In the 'powder bed' processes a point source of energy such as a laser or electron beam is selectively applied to a layer of powder as required on a layer by layer basis to build up a 3D part from a 'slicing' of a design file. Examples of this type of machine are the M270 produced by Electron Optical Systems GmbH (EOS) (laser "sintering"), the Realizer II marketed by MCP (laser "smelting") and the Concept Laser from Hofmann Innovation Group AG (Laser "Cusing®"). These all take metal powders under an inert atmosphere and direct a laser onto a layer of powder to solidify. Similarly there are well known polymer and wax processing machines that either selectively apply material or selectively apply a means of binding/fusing/promoting or inhibiting to form a 3D solid object on a layer by layer basis.

A typical work flow from design to manufacture for these layer-wise processes is for a Computer Aided Design (CAD) file to be converted into an .stl file—a format created by 3D Systems a US company. Stl files describe only the surface geometry of a three dimensional object without any representation of color, texture or other common CAD model attributes. The stl file is viewed and verified, support structures (if required) formed and other manipulations carried out within a program such as 'Magics' a software from Materialise of Leuven Belgium. Then the file is converted into a 'build' file typically an .sli file being the .stl file "sliced" into e.g. 0.20 mm slices that are used to direct the laser for each physical layer of the build.

The .sli files are then loaded into the layer-wise processing machine where they are associated with a set of process parameters some of which, such as, laser power, scanning speed and offset can be associated with the individual .sli files (whilst other process parameters such as layer thickness are general to all .sli files) that go to make a batch of parts within a 'job'.

The laser or other point source of heat has a finite spot size and creates a heat affected zone larger than its spot size and therefore to accurately build parts to the size required the centre of the point source of heat must be offset such that it is the edge of the heat affected zone that corresponds with the edge of the geometry to be formed. This 'offset' can be entered into software, however there is a practical problem. As it presently stands there is only a single global offset value for each .sli file. When forming e.g. small holes such as 0.5 mm in dia. the heat affected zone from the laser tends to close up the hole therefore a large offset value is required however this will affect the geometrical accuracy of the entire part.

More generally different aspects of a part may benefit from different build strategies.

It is well known that it is possible to build several distinct parts simultaneously and therefore multiple .sli files can be loaded into the laser sintering/melting machine to make a batch of parts each on a layer by layer basis.

From one aspect the invention is the splitting of a single part's file into multiple elements that represent different aspects or elements of that part, and either rejoining these files or loading the multiple .sli files into the layer wise manufacturing machine and applying different processing characteristics to the multiple elements' files where at least two files physically overlap in the layer-wise manufacturing process. By this means a certain feature such as a hole or screw thread may be built with one set of parameters such as 'laser offset' from one file whilst other aspects of that part may be built with different characteristics from another file. To achieve a satisfactory physical joining the two files preferably should overlap by at least one layer.

So for example a large structure containing tiny holes may be built effectively as two separate but overlying elements; one consisting of a large structure with larger holes and the other of rings that overlay the larger holes and form the precisely defined hole dimensions. The laser offset may be set in the one file to achieve critical dimensional accuracy at the large scale and the second file has the laser offset to achieve the small hole dimensional accuracy.

In another example a computer file representing a part with threaded studs may be split into an element without threaded studs and another file representing the array of threaded studs. The file of threaded studs may be manipulated e.g. laser offset to ensure their accurate formation and the file of the part without the studs manipulated to ensure its accurate formation. The two files are then overlapped sufficiently to ensure the studs are joined to the part and then the two files overlaid in the build file that is sent to the layer wise processing machine.

In another example a part may require a very good surface finish impossible to achieve with the state of the art in layer processing machines at certain areas. A machining or polishing allowance is selectively required and the part must therefore be oversize—but only in certain areas. This may be achieved by laser offset to make the part larger—however this is a global adjustment—effectively the laser is moved such that its centre point more nearly is at the outer edge of any geometry. This however would e.g. close up fine holes and in any case may not be required everywhere—only in the areas to be machined or polished. Again, by separating the one part into more than one element, manipulating these element files differently, creating a sufficient overlap as to joint them and then overlaying them with respect to one another in the build file sent to the machine is a good and useful method of achieving varying process characteristics within the single part made.

From another aspect the invention consists in a method of forming an article in a layer-wise manufacturing process from a computer software file representing the article including:

(i) dividing the file into sub-files in dependence of the size or other characteristics of features of the article to be created;

(ii) applying a process characteristic selected in dependence on the characteristic feature to each sub-file; and (iii) manufacturing the article in accordance with the sub files.

The sub files may be overlapped utilised to form features simultaneously.

The process may include applying a point source of heat to a layer. The point of impingement on the layer being offsetable characterised in that the feature is the feature size and that the process characteristic is the value of the offset.

The feature to be optimised may be geometrical, such as a thread or orifice.

The sub files may be loaded into the layer wise manufacturing apparatus performing the process as separate files or, alternatively, the sub files may be aggregated into a single file before loaded into a layer wise manufacturing apparatus for performing the method. The sub files may further overlap in a layer by layer sense such that the process is performed on a feature more than once.

In any of the above cases the part may be formed from a metal or polymer powder sintered, melted or otherwise fused together to form a solid object by the application of a point source of heat such as a laser or electron beam.

The invention also includes an article formed by any of the methods set out above having first body with large holes from the first file and a number of annuli, created from the second file, located in space so as to fit within the large holes.

The invention further includes a method of forming an article in a manufacturing process from a computer software file representing the article including:
 (i) creating a first sub-file representing the article and defining a number of openings having a dimension above a first predetermined value;
 (ii) creating a second sub-file representing solid elements to lie within the openings to define final openings of second predetermined value less than the first predetermined value; and applying the two sub-files to manufacture the articles so that the body and the elements are formed integrally.

Although the invention has been defined above it is to be understood it includes any inventive combination of the features set out above or in the following description.

BRIEF DESCRIPTION OF THE DRAWINGS

The invention may be performed in various ways and specific embodiments will now be described, by way of example, with reference to the accompanying drawings, in which.

DETAILED DESCRIPTION

Figure 1:
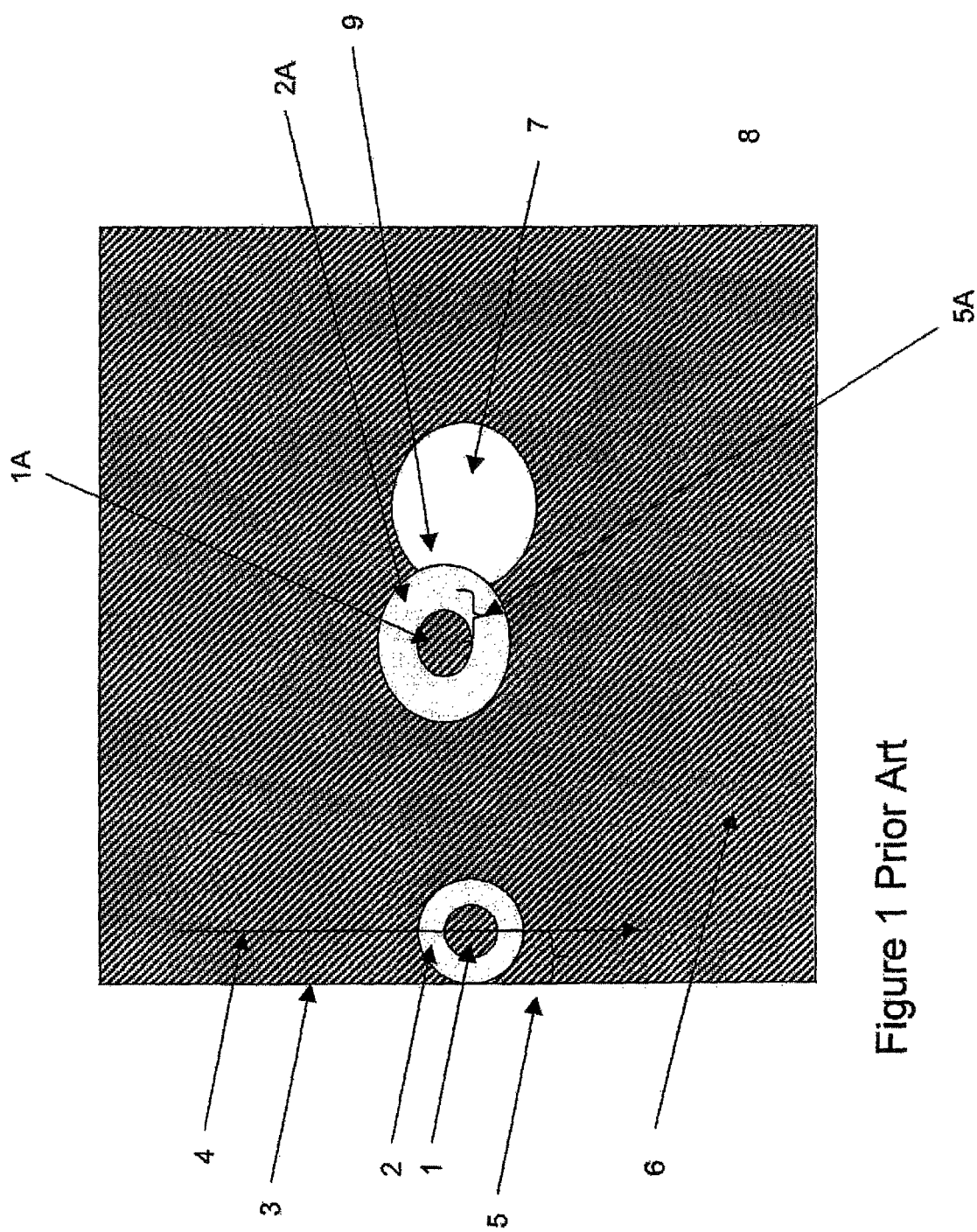
FIG. 1 is a schematic illustration of a first prior art method.

In FIG. 1 (prior art) is shown schematically and in plan view a physical layer of a powder bed 8 and the laser spot 1 selectively illuminating it and the heat affected zone 2 that will cause powder to sinter or melt to form a layer 6 of an object with an edge 3. The centerline of the laser scans along a direction indicated at 4 that is necessarily offset as shown at 5 to correctly sinter/melt the powder to form the object 6 to the correct size. Also shown is a hole 7 in the object 6 (that can be of any shape) Where this hole (or other geometric aspect) is relatively small and approaches the size of the laser spot 1A the heat affect zone 2A increases in size as the laser is directed to a relatively small area around geometry 7. As the laser offset 5A is the same as laser offset 5 then the enlarged heat affected zone solidifies the powder outside the desired geometry 7 and causes the dimension to be inaccurate as indicated at 9.

Unfortunately the state of the art of the layer-wise processing software such as in an EOS M270 is that only a global offset 5/5A can be generated and the existing method to solve this problem is taken from the castings industry—to produce a 'castings drawing' which is the desired geometry manipulated to take into account the distortions created by the casting process (e.g. shrinkage). Using this prior art method a CAD file is created where geometry 7 is enlarged such that, as built, it is the correct size. Whilst this is a workable solution it is not well suited to the practicalities of commerce where the layer process manufacturing is carried out e.g. by a bureau who are not the designers.

Figure 2:
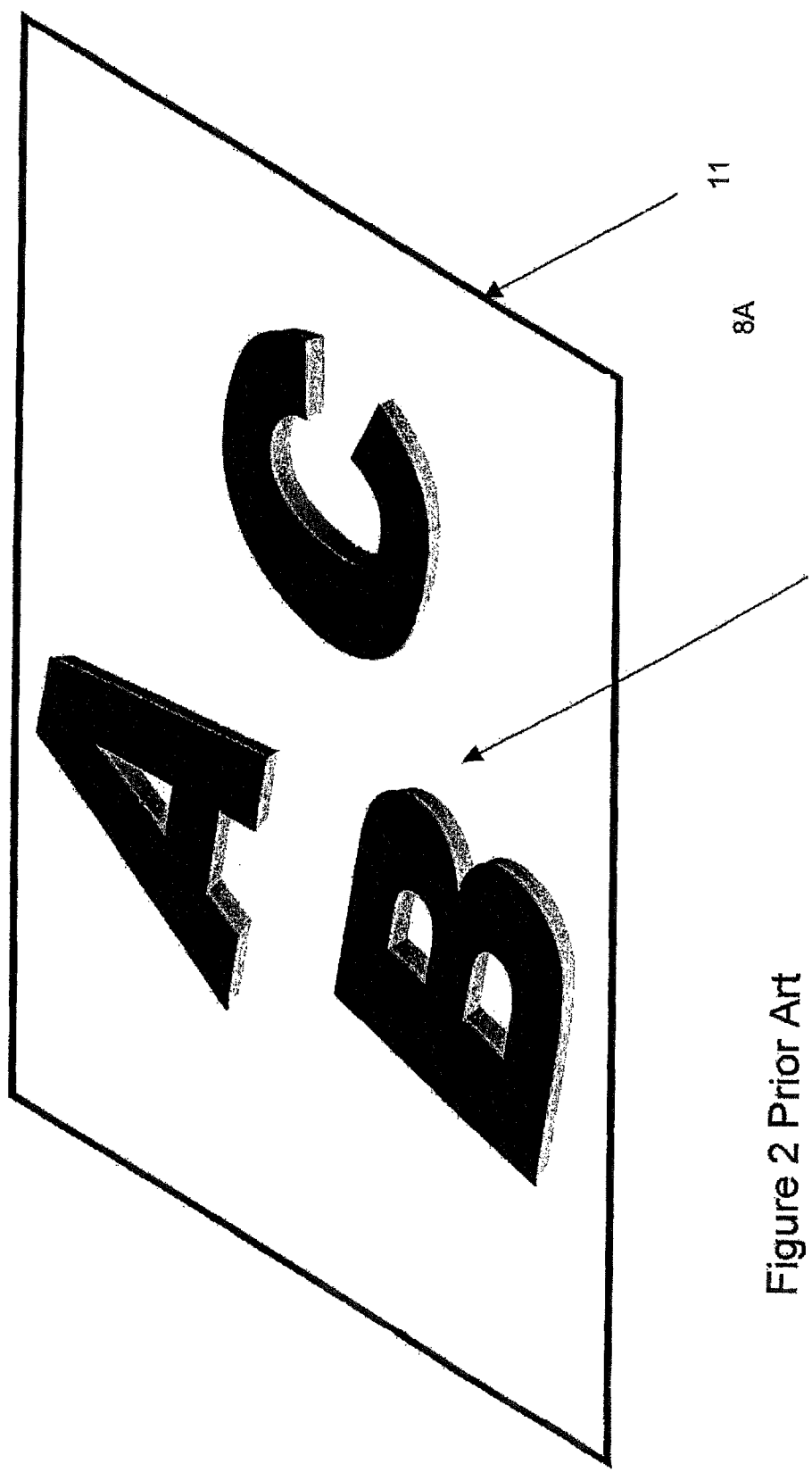
FIG. 2 is an illustration of an article made by a second prior art method.

In FIG. 2 (prior art) is shown diagrammatically at 10 objects A, B C formed simultaneously layer by layer in a powder bed volume 8A on a build plate 11 by batching together multiple .sli files for building by the layer processing machine. It is well known and established practice to batch parts together and as each layer is selectively sintered/melted by the laser beam the objects A, B and C and formed concurrently.

At FIG. 3(a) to (d) illustrate embodiments of the invention. Part 14 is required to be made that has both large scale and small scale geometries. In the Applicant's method the .stl file is split into 2 elements e.g. element 12 and element 13 where differing process characteristics are required e.g. beam offset, to achieve desired materials and/or geometric goals. Element 12 in this example is geometrically a plate and element 13 is a stud requiring high precision to form a functional thread to international standards. Such a thread may be difficult to cut in very hard materials such as cobalt chrome, and this may be one of the reasons why the laser/powder bed manufacturing process is preferred. Splitting the single file into two files and considering the single part as in fact multiple elements enables these different processing strategies. The separate resultant .sli files are then overlayed in the build file sent to the powder bed laser sintering/melting machine (e.g. EOS M270) to recreate the single part in the powder bed (see FIG. 3c). To achieve a satisfactory joining of the two elements they are overlapped as indicated at 15 by e.g. 1 layer of the layering process (e.g. 20 microns).

Figure 3:
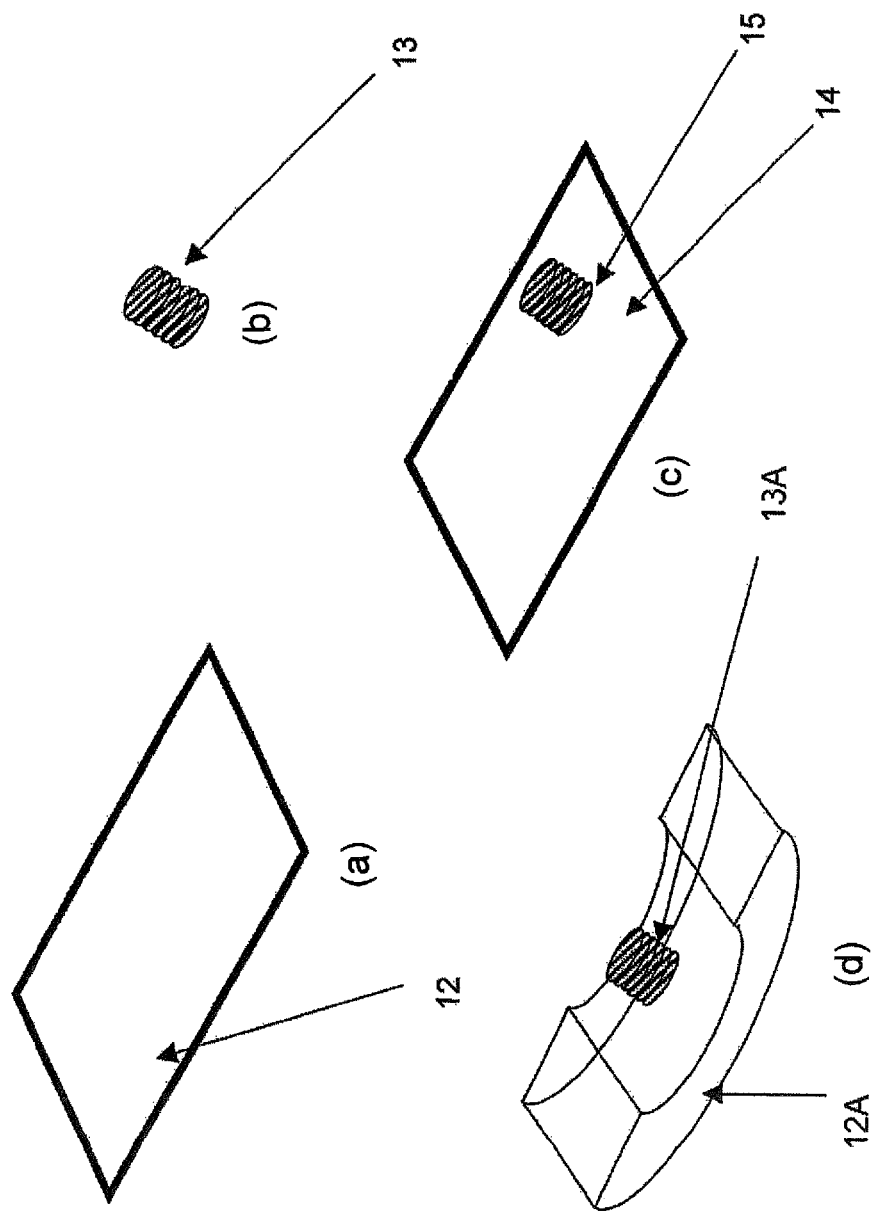
FIG. 3 shows two notional parts of an article at (a) and (b), which are combined utilising an embodiment of the invention shown at (c), and (d) illustrates a second article.

What is perhaps surprising is that the two elements of the part do not have to exist uniquely in different layers of the layer-wise manufacturing process but can exist within the same layer (as can be seen in FIG. 3d) so the geometry indicated by element 12A with element 13A is also possible i.e. object 13 can lie within object 12.

An associated example of the invention is the construction of a cup (with handle). The cup (with handle) is received as a single CAD file. The Applicants effectively split the cup body from the handle to form 2 files, apply a characteristic e.g. laser offset to each file separately and then abutting and overlying these two files in their xyz coordinates for manufacture in the powder bed laser sintering machine such that the cup (with handle) is made from two files. The Applicants can be sure they are joined because of the overlapping of the files 3D positions. This overlap is surprisingly acceptable to the machine and this approach can be taken a step further where the handle can be made inside the cup and made adhering to the inside of the cup. In essence the two files can exist in the same 3D space. The joining area has been micrograph and no joining is visible.

Whilst the example process described is a selective laser sintering/melting of metals (and polymers) it can readily be appreciated that the invention also applies to any layer-wise manufacturing process where differing process characteristics are desirable. Such layer-wise manufacturing processes also include for example 'ink-jet printing' type extrusion of waxes or polymers or the selective dispensing of inhibitors or promoters on a layer by layer basis.

And whilst the method is described using the current state of the software art it does also generally describe a process workflow that can be at least partially automated by e.g. software for applying varying process parameters to differing aspects of a part to be built by splitting the single part to be built into elements and applying varying processing characteristics to the different elements and then rejoining those elements to create a single co-joined part.

What is claimed is:

1. A method of forming an article from a computer software file representing the article, wherein the method comprises a layer-wise manufacturing process of fusing metal or polymer powder by applying a point source of heat to the powder in such a way as to create layers of the article one at a time, and includes:
   (i) dividing the file into sub-files each representing at least a respective one of features of the article to be created, based on differences in characteristics of the features, wherein the sub-files overlap such that respective parts of the sub-files each represent the same region in at least one of the layers of the article to be created;
   (ii) correlating with each of the sub-files a value of a parameter of the manufacturing process in dependence on the characteristic of the feature represented by the sub-file; and
   (iii) subsequently loading data of the correlated sub-files into a layer-wise manufacturing apparatus, and operating the apparatus to manufacture the article using the process controlled in accordance with the data of the correlated sub-files, wherein the parameter of the manufacturing process is varied in creating the layer and the process is performed on the same portion of the metal or polymer in accordance with data of each of the correlated sub-files during the course of forming the layer such that said region in the layer is processed more than once during the course of forming the layer and before the forming of a subsequent layer thereon has begun.

2. A method as claimed in claim 1 wherein the parameter is the value of an offset of the spot from a feature of the article to be created within the layer.

3. A method as claimed in claim 1 wherein the features are geometrical features.

4. A method as claimed in claim 1 wherein the sub-files are loaded into the layer-wise manufacturing apparatus as separate files.

5. A method as claimed in claim 1 wherein the sub-files are aggregated into a single file and the single file is loaded into the layer-wise manufacturing apparatus.

6. A method of forming an article in a manufacturing process from a computer software file representing the article wherein the article has a body and solid elements lying within openings in the body, respectively, and the method comprises a layer-wise manufacturing process of fusing metal or polymer powder by applying a point source of heat to the powder in such a way as to create layers of the article one at a time, and includes:
   (i) creating a first sub-file representing the body of the article and a number of openings in the body having a dimension above a first predetermined value;
   (ii) creating a second sub-file representing solid elements to lie within the openings such that final openings of the article have a dimension of a second predetermined value less than the first predetermined value,
   wherein the first and second sub-files overlap such that part of the first sub-file and part of the second sub-file both represent the same region in at least one of the layers of the article to be created; and
   (iii) subsequently loading data of the sub-files into a layer-wise manufacturing apparatus, and operating the apparatus to manufacture the article in accordance with the sub-files so that the process is performed on the same portion of the metal or polymer in accordance with data of each of the first and second sub-files during the course of forming the layer and before the forming of a subsequent layer thereon has begun such that the body and the elements are formed integrally in the layer.

7. A method of fabricating an article layer by layer from a computer software file representing the article, wherein the method comprises a layer-wise manufacturing process of fusing metal or polymer powder by applying a point source of heat to the powder in such a way as to create layers of the article one at a time; and includes:
   (i) dividing the computer software file into surface geometry files each representing a respective layer of the article to be built using the manufacturing process;
   (ii) manipulating at least one of the surface geometry files into sub-files that overlap such that parts of each of the sub-files represent the same portion of the article to be created within a region of the layer, and wherein each of the sub-files contain data of a value of a parameter of the manufacturing process, and the value of the parameter represented by the data contained in one of the sub-files differs from the value of the same parameter represented by the data contained in another of the sub-files;
   (iii) manufacturing the article using the manufacturing process controlled in accordance with the data contained in the sub-files, wherein said portion of the article within the layer is formed by first applying the point source of heat to a portion of the metal or polymer powder according to the parameter represented by the data contained in one of the sub-files and subsequently applying the point source of heat to said portion of the metal or polymer powder according to the parameter represented by the data contained in another of the sub-files during the course of forming the layer and before the subsequent forming of a layer thereon has begun.

8. A method as claimed in claim 7 wherein the values of the parameter is the amount of offset of the spot from a location where said portion of the article is being created.

9. A method as claimed in claim 7 wherein said portion of the article is a geometrical feature.

10. A method as claimed in claim 7, wherein the surface geometry files are Standard Tessellation Language (STL) files.

* * * * *